W. A. DOBLE.
MANUFACTURE OF CYLINDERS, PIPES, &c.
APPLICATION FILED JUNE 26, 1914.
1,240,957.
Patented Sept. 25, 1917.
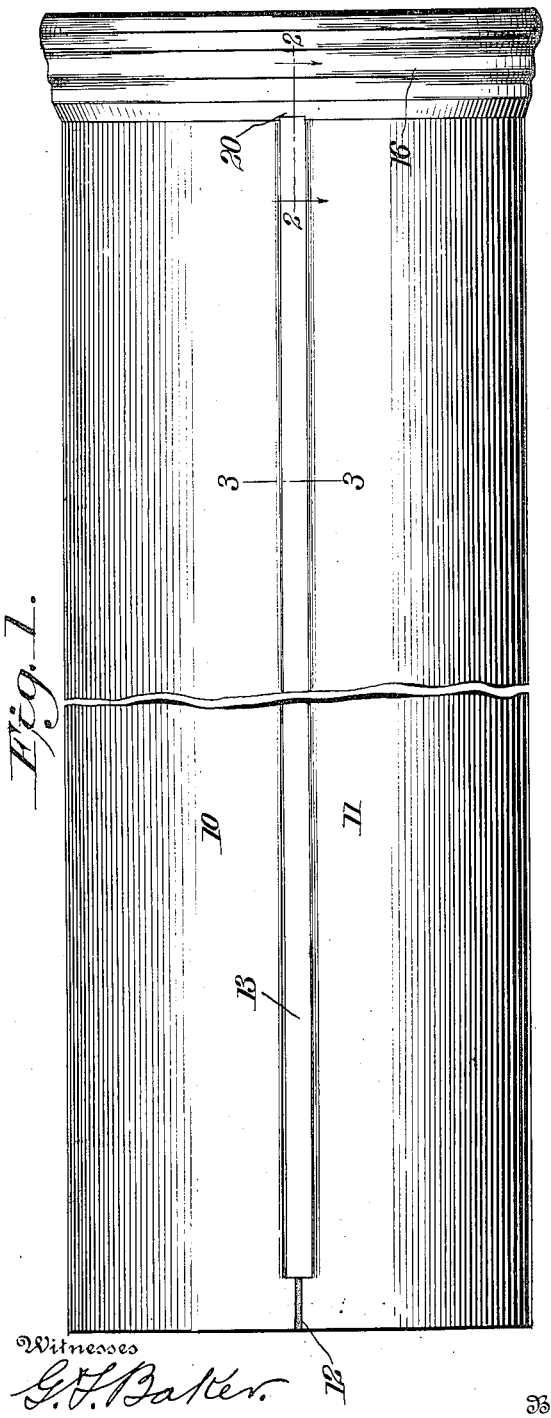
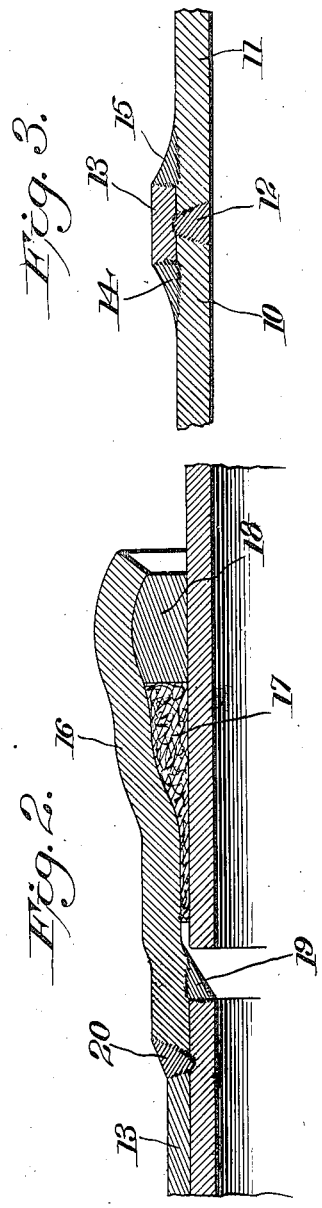

UNITED STATES PATENT OFFICE.

WILLIAM A. DOBLE, OF SAN FRANCISCO, CALIFORNIA, ASSIGNOR TO PELTON WATER WHEEL COMPANY, OF SAN FRANCISCO, CALIFORNIA, A CORPORATION OF CALIFORNIA.

MANUFACTURE OF CYLINDERS, PIPES, &c.

1,240,957.  Specification of Letters Patent.  Patented Sept. 25, 1917.

Application filed June 26, 1914. Serial No. 847,491.

*To all whom it may concern:*

Be it known that I, WILLIAM A. DOBLE, a citizen of the United States, and resident of San Francisco, county of San Francisco, State of California, have invented certain new and useful Improvements in the Manufacture of Cylinders, Pipes, &c., of which the following is a specification.

This invention relates to the manufacture of pipes and cylindrical structures and has for an object the provision of an improved method of manufacture whereby the longitudinal and transverse joints in the structure are welded in such a way as to provide a joint which is stronger than the material of which the pipe is constructed.

A further object is to provide a pipe structure in which the interior of the pipe is perfectly smooth and the ends are so formed as to avoid the use of rivets which would make a rough interior and offer resistance to the flow of water or other fluid through the pipe.

With these and other objects, as will appear from the following description, taken in connection with the accompanying drawings, the invention may be embodied in various forms, one of which is illustrated in the drawings.

In the drawings,

Figure 1 is a side elevation of a section of pipe:

Fig. 2 is an enlarged longitudinal section of the end portion of the pipe; and

Fig. 3 is a fragmentary transverse section on the line 3—3 of Fig. 1.

Referring to the drawings, it will be seen that the pipe illustrated is constructed of sheet metal rolled into cylindrical form and the longitudinal edges 10 and 11 of the sheet are secured together by means of a butt weld 12. A cover plate or butt strap 13 is arranged on the outside of the pipe over the weld 12 and is welded to the outer surface of the pipe along its longitudinal edges, as indicated at 14 and 15. It will be seen that the weld 12 secures the strap 13 to the edge portions 10 and 11 so that each of these edge portions is secured to the strap 13 along two distinct lines. It will also be seen that the strap 13 is welded to the completed pipe structure along three independent lines. The welds 12, 14 and 15 are preferably made by means of an electric arc and the metal forming the welds is derived from one of the electrodes which melts away as the welding process proceeds. In practice I prefer to first make one of the welds 14 or 15 and then the other of these welds and finally make the weld 12 which unites the edge portions 10 and 11 to the strap 13 and fills up the joint between these edge portions and produces a smooth interior surface. It has been proposed heretofore to make pipes by rolling up the metal sheet and making a butt weld similar to the weld 12 but without employing a strap 13. The metal forming the weld has been found to be very brittle and of low elongation and as a result the joint or weld in such a pipe has much less strength than the metal of the pipe so that the bursting stress to which the pipe may be subjected is determined by the strength of the weld. This is frequently from 50 to 60 per cent. of the strength of the plate of which the pipe is formed and is very uncertain and frequently pipes welded in this manner, when subjected to bursting pressure, break open from end to end along the welded joint.

By my improved construction the joint is stronger than the plate of which the pipe is constructed and therefore stronger than it would be possible to make with any form of riveted construction because in a riveted construction the strength of the joint is less than that of the pipe itself on account of the rivet holes. Referring to Fig. 3, it will be seen that on account of having the strap 13 welded to the edge portions 10 and 11 at points remote from the weld 12 and by securing the plate 13 to the edge portions 10 and 11 by the weld 12 the strength of the joint is increased to an amount greater than that of the metal of which the pipe is constructed. The stress in the metal is taken partly by the weld 12 and partly through the strap 13 and the arrangement of the welds is such that when the pipe is subjected to bursting pressure there is practically no elongation in the joint, all of the elongation being in the other portions of the sheet of which the pipe is constructed. It is therefore possible to construct a pipe, by my improved method, of lighter material than by methods heretofore employed, because the joint, being stronger than the metal of the pipe, it is only necessary to provide a sheet having the proper thickness to withstand the pressure. In the common form of butt welded pipe above described, it is necessary to use sheet metal of greater thickness than is required to withstand the bursting pressure in order to have sufficient surfaces along the joint to make a weld having the requisite strength. Likewise in riveted construction it is necessary to use a sheet metal of greater thickness than is required to withstand the bursting pressure because the sheet is weakened by the rivet holes.

In carrying out my invention I also provide an improved method of securing the end ring 16 to the pipe. This construction is shown in Fig. 2 and the cross section of the ring is such as to provide the necessary space for the usual hemp packing 17 and the lead 18 which seal the joint. The ring is preferably made of heavier material than the pipe itself in order to withstand the stresses to which it is subjected and is sleeved onto the end of the pipe in abutting relation to the strap 13, the ends of the strap being a slight distance from the ends of the pipe. The ring 16 is welded to the end of the pipe, as indicated at 19 and the edge of the ring is welded to the outer surface of the pipe and to the strap 13, as shown at 20. This construction is very simple and by having the strap 13 shorter than the pipe and in abutting relation to the ring 16, it is possible to make the latter of true circular form without irregularities.

If desired the different sections of pipe may be welded together in the manner indicated in Fig. 3, in which case the strap 13 would be a ring surrounding the sections and covering the joint between them, the ring being welded to the outer surface of the pipes and to the longitudinal straps 13 thereof.

Having described my invention what I claim and desire to secure by Letters-Patent is, 1. A joint construction comprising two parts, an edge of one part arranged parallel and close to an edge of the other part, a strap arranged exteriorly of the joint and overlying the two edges and having one of its longitudinal edges welded to one of the said parts and its other longitudinal edge welded to the other part, and a weld between the meeting edges of the said parts.

2. A joint construction comprising two parts arranged to form a butt joint, a butt weld joining the said two parts and a strap arranged exteriorly of and overlying the joint and welded to the parts along three spaced parallel lines.

3. As an article of manufacture, a sheet metal cylindrical pipe having a longitudinal butt weld, and a strap arranged exteriorly of and overlying the said weld and having its longitudinal edges welded to the pipe.

4. As an article of manufacture, a sheet metal cylindrical pipe having a longitudinal butt weld, and a strap arranged exteriorly of and covering said butt weld and welded thereto on the exterior of the pipe and having its longitudinal edges welded to the pipe along lines spaced from the butt weld.

5. As an article of manufacture a sheet metal cylindrical pipe having a longitudinal joint, the abutting edges being beveled to form a space therebetween wider at the one than at the other surface of the pipe, and a strap overlying the joint and having its longitudinal edges welded to the pipe.

In testimony whereof I affix my signature in presence of two witnesses.

WILLIAM A. DOBLE.

Witnesses:
FREDERICK G. FELLER,
F. CH. HORNBERGER.